US007564775B2

(12) United States Patent
Jayaraman et al.

(10) Patent No.: US 7,564,775 B2
(45) Date of Patent: Jul. 21, 2009

(54) TIMING CONTROL IN ORTHOGONAL FREQUENCY DIVISION MULTIPLEX SYSTEMS BASED ON EFFECTIVE SIGNAL-TO-NOISE RATIO

(75) Inventors: Srikant Jayaraman, San Diego, CA (US); Hao Xu, San Diego, CA (US); June Namgoong, Chula Vista, CA (US); Michael John Mangan, San Diego, CA (US); Peter J. Black, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 963 days.

(21) Appl. No.: 11/119,240

(22) Filed: Apr. 29, 2005

(65) Prior Publication Data

US 2006/0245347 A1 Nov. 2, 2006

(51) Int. Cl.
*H04J 11/00* (2006.01)
(52) U.S. Cl. ...................................... 370/208; 370/503
(58) Field of Classification Search ................. 370/203, 370/208, 209, 252, 337, 347, 503; 375/260, 375/293; 714/48, 731
See application file for complete search history.

(56) References Cited

U.S. PATENT DOCUMENTS

| 5,627,863 | A | 5/1997 | Aslanis et al. |
| 6,021,110 | A * | 2/2000 | McGibney ................... 370/208 |
| 6,907,026 | B2 * | 6/2005 | Akiyama ..................... 370/344 |
| 2003/0156534 | A1* | 8/2003 | Coulson et al. ............. 370/210 |
| 2003/0165189 | A1 | 9/2003 | Kadous |
| 2003/0223354 | A1* | 12/2003 | Olszewski ................... 370/208 |
| 2004/0037214 | A1* | 2/2004 | Blasco Claret et al. ....... 370/203 |
| 2004/0264588 | A1* | 12/2004 | Song et al. ................... 375/260 |
| 2006/0062322 | A1 | 3/2006 | Namgoong et al. |
| 2006/0120467 | A1* | 6/2006 | Miyoshi et al. .............. 375/260 |

FOREIGN PATENT DOCUMENTS

| EP | 1235379 | 8/2002 |
| TW | 577202 | 2/2004 |
| TW | 200503461 | 1/2005 |
| TW | 200507206 | 2/2005 |
| WO | WO2004028055 | 4/2004 |

OTHER PUBLICATIONS

R.E. Blahut, "Principles and Practice of Information Theory," Addison Wesley, 1991, Section 7.8, pp. 272-279.
International Search Report - PCT/US06/016063, International Search Authority - European Patent Office, Sep. 12, 2006.
Written Opinion - PCT/US06/016063, International Search Authority - European Patent Office, Sep. 12, 2006.
International Preliminary Report on Patentability - PCT/US06/016063, The International Bureau of WIPO, Geneva, Switzerland - Oct. 30, 2007.

* cited by examiner

*Primary Examiner*—Ricky Ngo
*Assistant Examiner*—Kan Yuen
(74) *Attorney, Agent, or Firm*—D. Scott Juneau

(57) ABSTRACT

A spread-spectrum communication system provides an effective signal-to-noise ratio (SNR) of received orthogonal frequency division multiplex (OFDM) slots in the presence of timing errors. Effective SNR can serve as a diagnostic tool for determining whether there was a timing error when a measured packet error rate (PER) remains high, and a predicted PER from the effective SNR remains low. A loop can use the effective SNR to control a time reference used by an OFDM decoder.

35 Claims, 10 Drawing Sheets

TIMING CONTROL IN ORTHOGONAL FREQUENCY DIVISION MULTIPLEX SYSTEMS BASED ON EFFECTIVE SIGNAL-TO-NOISE RATIO

BACKGROUND

1. Field

The present disclosure generally relates to communication systems and specifically to timing control in orthogonal frequency division multiplex systems.

2. Background

In a spread-spectrum system, a mobile station may receive transmissions from one or more base stations. Each mobile station and base station may use a specific spreading code to identify its signal transmissions.

BRIEF DESCRIPTION OF THE DRAWINGS

Various embodiments of the disclosure will become more apparent from the following description and appended claims, taken in conjunction with the accompanying drawings. These drawings depict only example embodiments and are not to be considered limiting the disclosure's scope.

DETAILED DESCRIPTION

Figure 1:
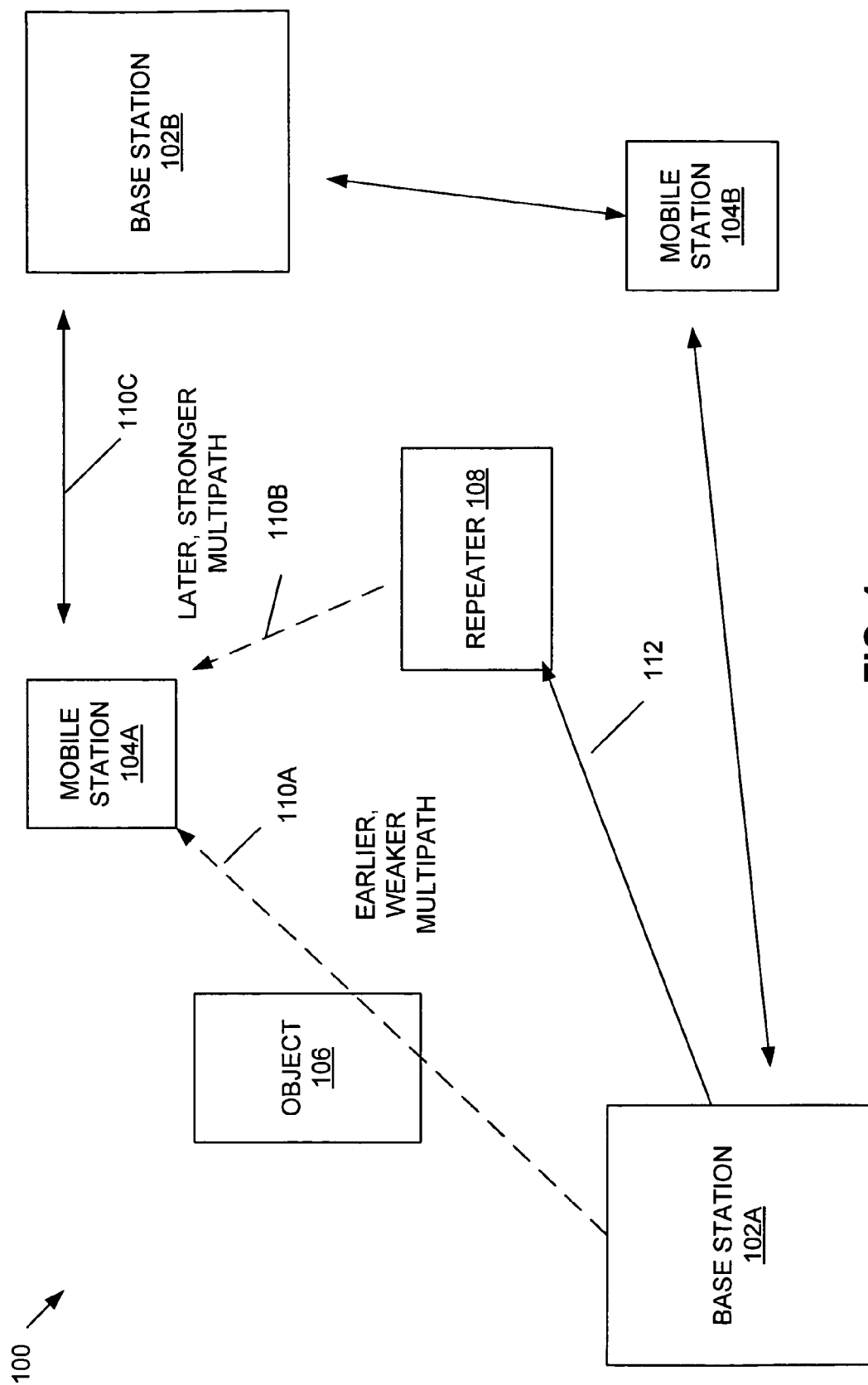
FIG. 1 illustrates a communication system comprising base stations and mobile stations.

Any embodiment described herein is not necessarily preferable or advantageous over other embodiments. While various aspects of the present disclosure are presented in the drawings, the drawings are not necessarily drawn to scale unless specifically indicated.

FIG. 1 illustrates a communication system 100 comprising base stations 102A, 102B and mobile stations 104A, 104B. The system 100 may have any number of base stations and mobile stations. The communication system 100 may use one or more communication techniques, such as code division multiple access (CDMA), High Rate Packet Data (HRPD), also referred to as High Data Rate (HDR), as specified in "cdma2000 High Rate Packet Data Air Interface Specification," TIA/EIA/IS-856, CDMA 1× Evolution Data Optimized (EV-DO), Wideband CDMA (WCDMA), Universal mobile telecommunications system (UMTS), Time Division Synchronous CDMA (TD-SCDMA), Orthogonal Frequency Division Multiplexing (OFDM), etc.

FIG. 1 also shows two multipath signals 110A, 110B received by the mobile station 104A as a result of an object 106 between the base station 102A and mobile station 104A. A repeater 108 or the distance between the repeater 108 and base station 102A may delay a signal 110B transmitted from the base station 102A to the mobile station 104A.

A "mobile station" described herein may refer to various types of devices, such as a wired phone, a wireless phone, a cellular phone, a lap top computer, a wireless communication personal computer (PC) card, a personal digital assistant (PDA), an external or internal modem, etc. A mobile station may be any device that communicates through a wireless channel or through a wired channel, for example using fiber optic or coaxial cables. A mobile station may have various names, such as access terminal, access unit, subscriber unit, mobile device, mobile unit, mobile phone, mobile, remote station, remote terminal, remote unit, user device, user equipment, handheld device, etc. Mobile stations may be mobile or stationary and may be dispersed throughout the communication system 100 of FIG. 1. Mobile stations may communicate with one or more base station transceiver systems (BTSs), which are also called base stations, access networks, access points, Node Bs, and modem pool transceivers (MPTs).

One or more base stations 102 may transmit signals, such as broadcast/multicast content, to a plurality of mobile stations 104, i.e., multiple mobile stations 104 receive the same broadcast content. The broadcast transmission may use an OFDM communication technique. OFDM distributes data over a large number of equally-spaced frequency subcarriers (also called "carriers," frequency "tones" or frequency "bins"), as shown in FIG. 2.

Figure 2:
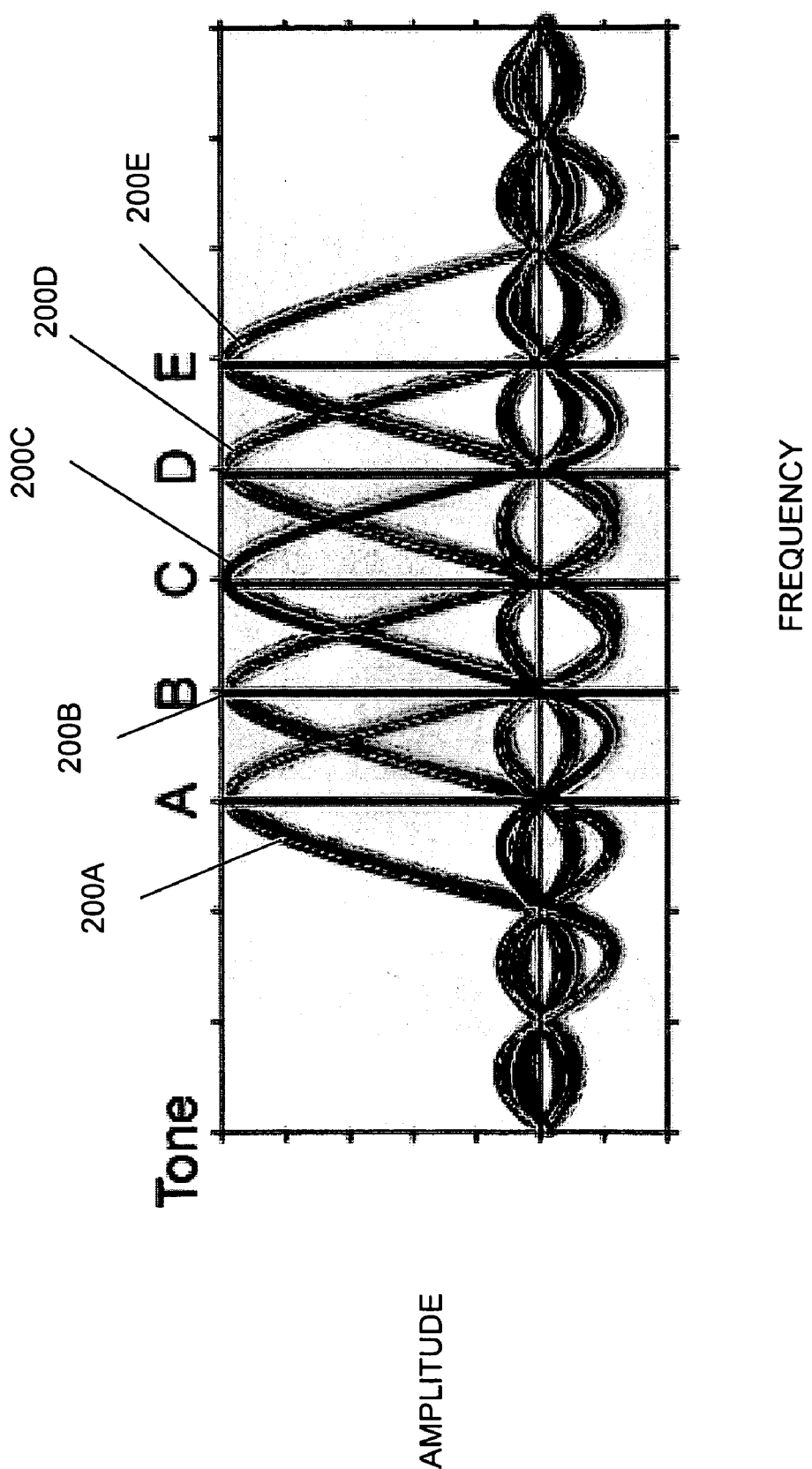
FIG. 2 illustrates an example of multiple orthogonal frequency division multiplex (OFDM) tones in the frequency domain, which may be transmitted in the system of FIG. 1.

FIG. 2 illustrates an example of multiple OFDM tones 200A-200E in the frequency domain (horizontal axis), where amplitude is represented on the vertical axis. Each tone 200 is "orthogonal" with every other tone as a result of spacing the tones apart at precise frequencies. The peak of each tone 200 corresponds to a zero level, or null, of every other tone. Thus, there is no interference between the tones 200A-200E. When a receiver samples at the center frequency of each tone 200, the only energy present is that of the desired signal, plus whatever noise happens to be in the channel. A detector of a given tone 200 is not affected by energy in the other tones 200. OFDM allows the spectrum of each tone 200 to overlap, and because they are orthogonal, they do not interfere with each other.

The sinusoidal waveforms making up the tones 200 in OFDM have a special property of being the only eigen functions of a linear channel. This special property prevents adjacent tones in OFDM systems from interfering with one another, in much the same manner that the human ear can clearly distinguish between each of the tones created by the adjacent keys of a piano. This property, and the incorporation of a small amount of guard time to each OFDM symbol 400 (FIG. 4A), enables the orthogonality between tones 200 to be preserved in the presence of multipath signal propagation.

A portion of a user's data is modulated onto each tone 200 by adjusting the tone's amplitude, phase or both. In one configuration, a tone 200 may be present or disabled to indicate a one or zero bit of information. In other configurations, Phase Shift Keying (PSK) or Quadrature Amplitude Modulation (QAM) may be used to modulate data onto each tone.

Figure 3:
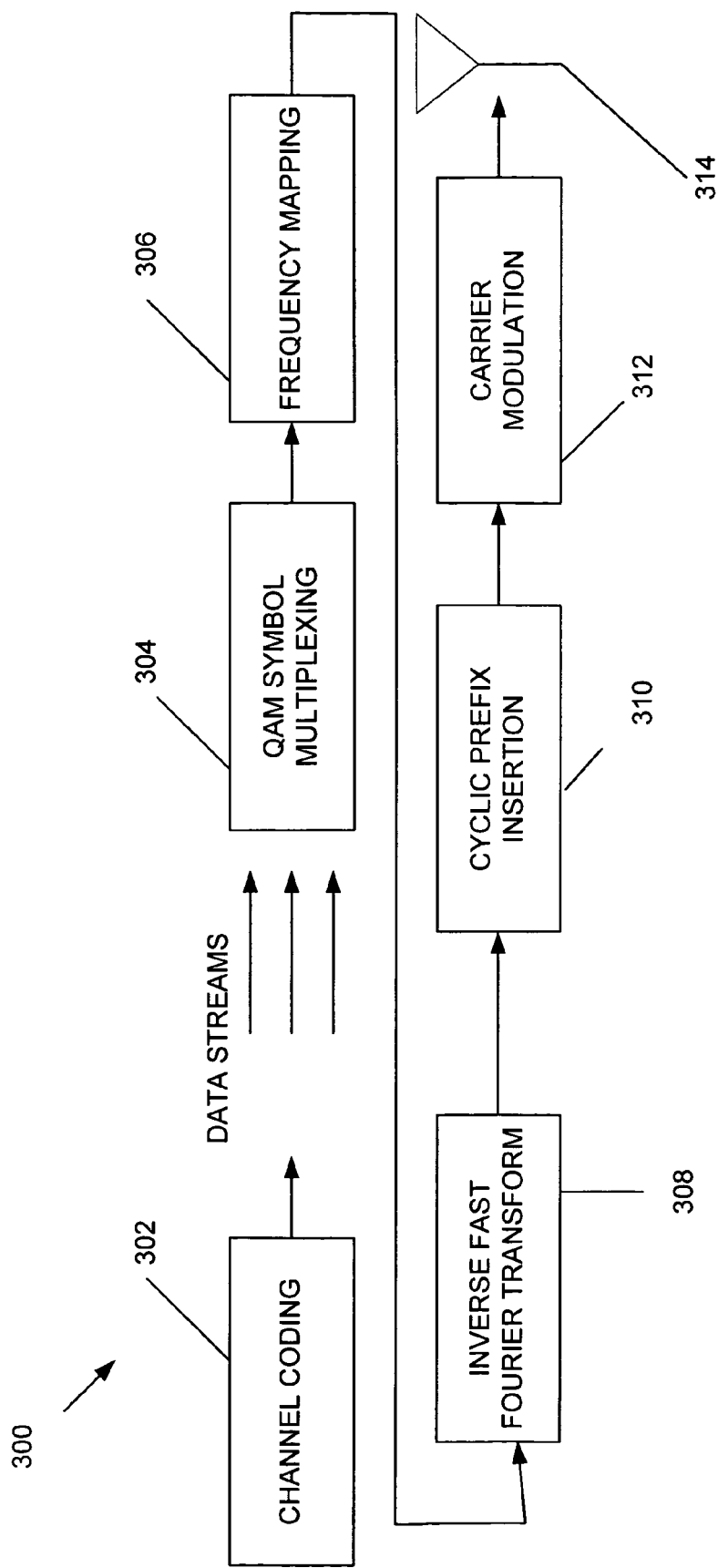
FIG. 3 illustrates an example of an OFDM processing path.

FIG. 3 illustrates an example of an OFDM processing path 300, which includes a channel coding unit 302, a modulation unit 304, a frequency mapping unit 306, an Inverse Fast Fourier Transform (IFFT) processing unit 308, a cyclic prefix insertion unit 310, a carrier modulation unit 312 and transmit circuitry 314, such as an antenna. The channel coding unit 302 takes a data stream, encodes it with a Turbo Code or Convolutional Code, interleaves or permutes the stream and splits it into N parallel data streams, each at a rate 1/N of the original rate. The input to channel coding unit 302 is a packet (not shown in FIG. 3), and the output is transmitted as one or more OFDM symbols 400 in FIG. 4.

The modulation unit 304 and frequency mapping unit 306 map each data stream to a tone at a unique frequency, and these tones are called "data tones." Concurrently, known "pilot symbols" are transmitted on a different set of tones called "pilot tones." These pilot tones may be used by the receiver to estimate the composite channel's frequency response, and to perform demodulation of the received OFDM signal. The modulation unit 304 may use QAM. OFDM modulation may be implemented using digital signal processing (DSP) software. An OFDM transmission may be considered Discrete Multi-Tone (DMT) Modulation with a trivial spreading code, e.g., the spreading code comprises all ones.

Figure 4A:
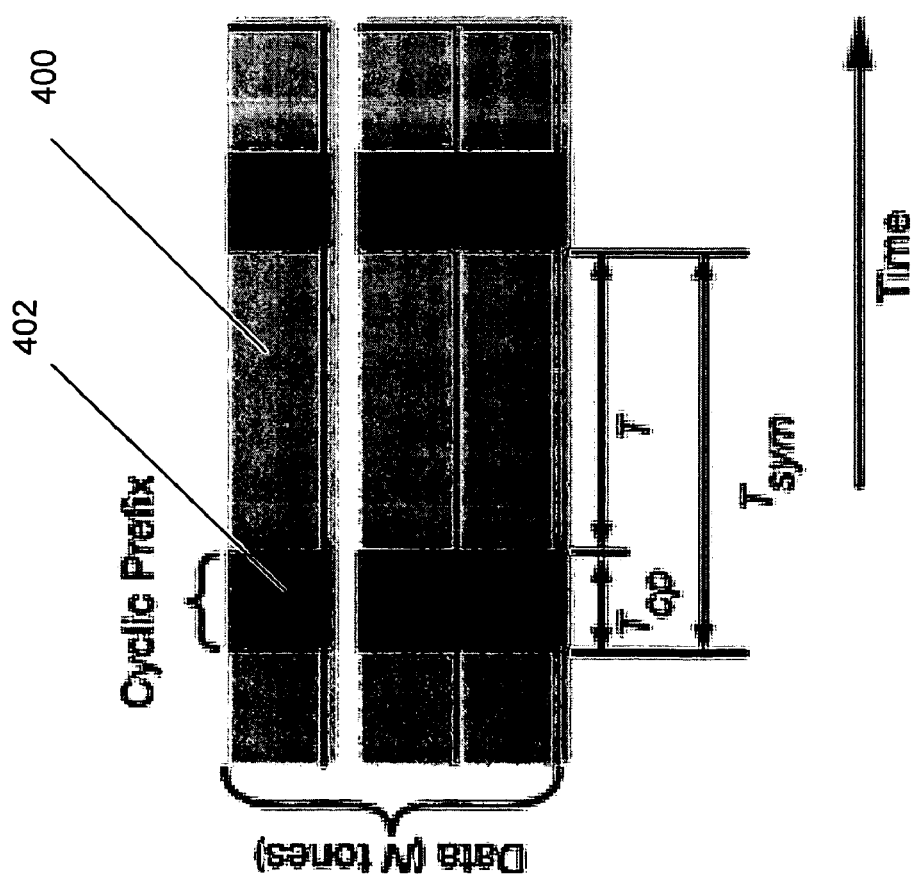
FIG. 4A illustrates a total OFDM symbol time period in which data may be carried on N tones.

The pilot tones and data tones are combined together using an IFFT 308 to yield a time-domain waveform. The cyclic prefix insertion unit 310 inserts a cyclic prefix 402 (FIG. 4A). The output of the cyclic prefix insertion unit 310 is provided to the carrier modulation unit 312 and transmit circuitry 314, which synthesizes radio frequency (RF) signals.

Figure 4B:
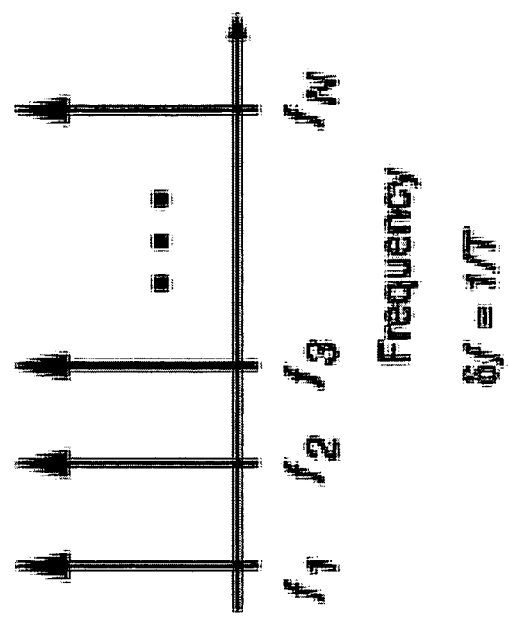
FIG. 4B illustrates OFDM symbols in the frequency domain.
Figure 4C:
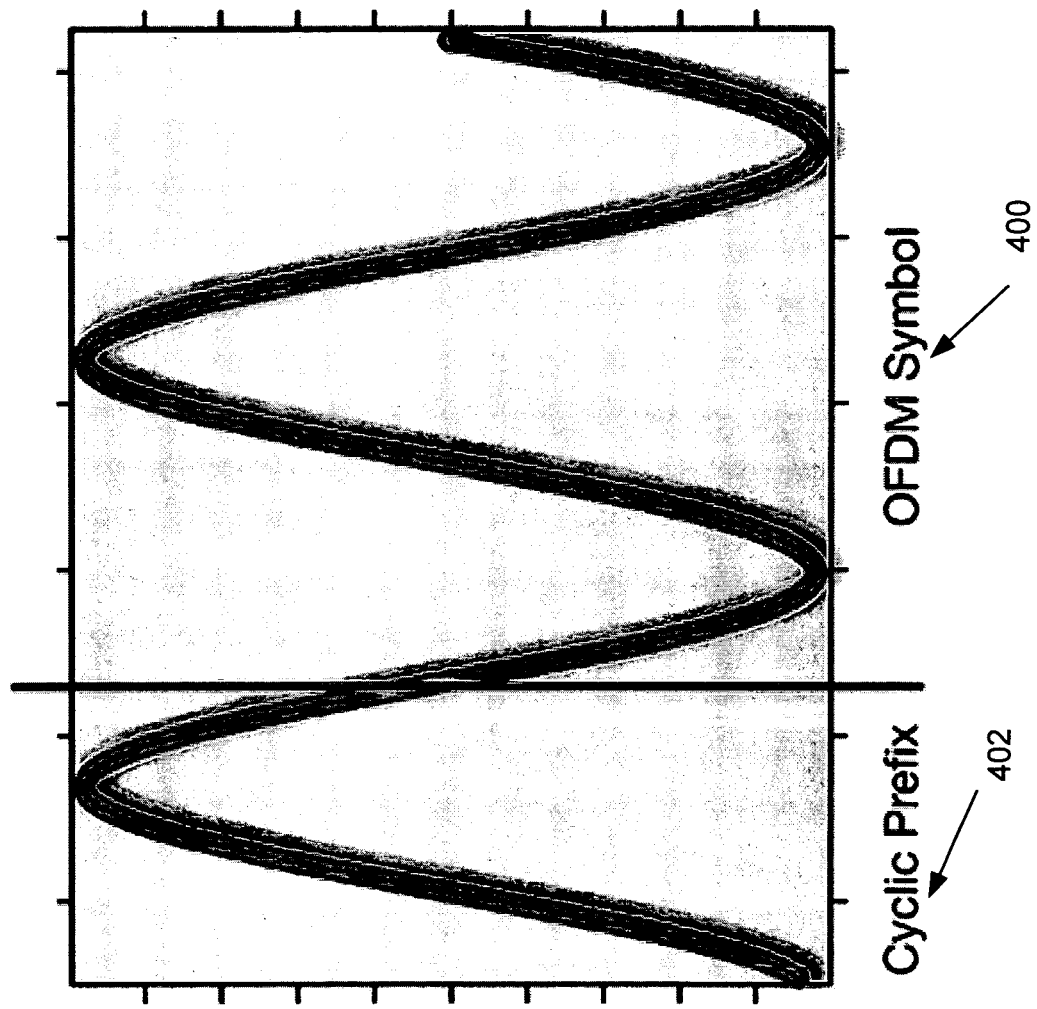
FIG. 4C illustrates an OFDM symbol and its cyclic prefix.

FIG. 4A illustrates a total OFDM symbol time period $T_{sysm}$, during which data may be carried on N tones. During the total symbol time period $T_{sysm}$, each tone may carry an OFDM symbol 400 and a cyclic prefix 402. FIG. 4B illustrates multiple OFDM symbols in the frequency domain. FIG. 4C illustrates an OFDM symbol 400 and its cyclic prefix 402.

To compensate for multipath delay, the cyclic prefix 402 is designed to be greater than a delay spread (time delay between the longest and earliest channel multipath). The cyclic prefix 402 provides a guard time to the OFDM symbol 400 to ensure orthogonality between subcarriers in the frequency domain, i.e., prevent subcarriers from interfering with one another. If the delay spread is too great, the subcarriers may overlap in the frequency domain, and orthogonality may be lost.

The cyclic prefix 402 may have a fixed length and may be appended at the beginning of each OFDM symbol 400 to turn the linear convolution of the channel into a "circular convolution." Ideally, the OFDM symbol length is large with respect to the cyclic prefix length to reduce overhead as far as possible. A fundamental trade-off is incurred as the cyclic prefix 402 must be long enough to account for the anticipated multipath delay spread experienced by the system 100. In other words, the cyclic prefix length should be "longer" than the length of the effective impulse response seen at a receiver.

Timing Acquisition

The performance of OFDM systems may rely on accurate timing acquisition. A large timing acquisition error may result in inter-symbol interference (ISI) from adjacent channels, an incorrectly estimated channel, and large performance degradations of a modem.

The description below analyzes a channel estimation algorithm and shows that an effective signal-to-noise ratio (SNR) metric, when properly calculated, is a robust measure of true channel performance even in the presence of timing acquisition errors. Based on this analysis, a timing acquisition (or timing control) outer loop can be implemented to detect and correct timing acquisition errors.

The description below may apply generally to any receiver receiving multipath OFDM signals. Specifically, the description below may apply to a mobile station 104A receiving multipath signals 110A, 110B, 110C broadcast from one or more base stations 102A, 102B.

Channel Estimation in the Presence of a Timing Error

A composite channel response (e.g., at a mobile station 104A receiving L multipath signals 110A-110C transmitted from one or more base stations 102A, 102B) in the time domain may be expressed as:

$$h(nT) = \sum_{l=1}^{L} a_l p(nT - \tau_l)$$

where L represents a total number of multipath components, $\alpha_l$ and $\tau_l$ represents the complex amplitude and delay, respectively, of the l-th multipath ray, p(t) represents the composite time-domain filter response of the transmit and receive pulse filters, and T represents the chip duration. For simplicity of presentation, a static channel is assumed. With correct timing, the frequency response of the channel on the pilot tones may be expressed as:

$$H_k \equiv H\left(\frac{k}{PT}\right)$$
$$= \sum_n h(nT) \exp\left\{-i\frac{2\pi nk}{P}\right\}$$

where H(f) is the Discrete Fourier Transform of h(nT), and k represents the index of the k-th pilot tone at frequency k/PT where P is the number of pilot tones.

Suppose due to a timing error, the starting time is incorrectly assigned to a sample with delay Δ chips after the first arrival path. Then it can be shown that the estimated channel response at the pilot tones may be expressed as:

$$\hat{H}_k = \exp\left\{i\frac{2\pi k\Delta}{P}\right\} \sum_n h(nT) \exp\left\{-i\frac{2\pi nk}{P}\right\} = \exp\left\{i\frac{2\pi k\Delta}{P}\right\} H_k \quad (1)$$

The equation (1) above leads to two important observations. First, on the pilot tones, despite an error in the timing reference, the amplitude response of the estimated channel $\hat{H}_k$ equals the amplitude response of the true channel $H_k$. Second, on the pilot tones, the error in timing reference leads to a linear phase shift across the pilot tones. Because of FFT-based channel estimation in OFDM systems, the estimated channel's time-domain response, derived from these phase shifted pilot tones, is a cyclic shift of the true channel's time-domain response.

Unfortunately, because the frequency response on the data tones is derived by interpolating the frequency response on the pilot tones, the interpolated amplitude and phase on the data tones can be significantly different from the true channel's values when the timing is incorrect. In the presence of a timing error of Δ chips, the frequency response on the data tones (least-squares interpolated from the pilot tones using FFTs) can be approximated by:

$$\hat{H}_k = \exp\left\{i\frac{2\pi k\Delta}{N}\right\}\left\{\sum_{n=0}^{\Delta-1} h_n \exp\left\{-i\frac{2\pi(P+n)k}{N}\right\} + \sum_{n=\Delta}^{P-1} h_n \exp\left\{-i\frac{2\pi nk}{N}\right\}\right\} \neq$$

$$\exp\left\{i\frac{2\pi k\Delta}{N}\right\}\sum_{n=0}^{P-1} h_n \exp\left\{-i\frac{2\pi nk}{N}\right\} = \exp\left\{i\frac{2\pi k\Delta}{N}\right\} H_k$$

where N is the number of tones in an OFDM symbol (both pilot and data tones), and k denotes the data tone index. In this equation, the first summation includes a subset of multipath components that occur before the timing reference Δ, and the second summation includes all paths that arrive after Δ. It is clear that the estimated channel response at the data tones can be significantly different from the true channel's response, and this may lead to significant errors during data demodulation.

Effective SNR in the Presence of Timing Errors

OFDM performance can be accurately predicted using a metric called Effective SNR when there is no timing error. For a packet encoded with a certain rate code (e.g., a rate ¾ code) and modulated using a certain transmit constellation (e.g., 16-QAM), if the Effective SNR metric is less than a certain threshold (e.g., 11.4 dB), the packet is highly unlikely to be decodable. Conversely, if the Effective SNR metric exceeds said threshold, the packet is highly likely to be correctly decoded. For a typical OFDM system, as long as the number of pilot tones exceeds the largest delay path in the channel, the Shannon/Nyquist sampling theorem guarantees that the effective SNR metric can be calculated from the channel frequency response on the pilot tones alone.

The Effective SNR metric is calculated from the channel responses $H_k$ on the pilot tones as follows. First, the noise variance on the pilot tones may be estimated using an estimation procedure similar to co-assigned U.S. patent application Ser. No. 11/047,347, filed on Jan. 28, 2005, entitled "Noise Variance Estimation in Wireless Communications for Diversity Combining and Log-Likelihood Scaling." Let $\sigma^2$ denote the estimated noise variance. Then, an Effective SNR metric may be computed through the formula $$SNR = C^{-1}\left(\frac{1}{P}\sum_{k=1}^{P} C\left(\frac{|H_k|^2}{\sigma^2}\right)\right)$$

where C(x) is the capacity of a Gaussian Channel with SNR x and input constrained to the selected type of modulation such as, e.g., 64 QAM or 16 QAM. For example, if the transmitted constellation is restricted to a set of points $\{c_i : i=1, \ldots, J\}$ in the complex plane, where the points are normalized according to:

$$x \equiv \frac{1}{2}\sum_j \frac{|c_j|^2}{J},$$

then, the constrained capacity function C(x) is given by:

$$C(x) \equiv \log J -$$
$$\sum_j \frac{1}{J}\int_{-\infty}^{\infty}\int_{-\infty}^{\infty} \frac{1}{2\pi} e^{-|u^2+v^2|/2} \log\sum_i e^{-|c_j-c_i|^2/2} e^{-\text{Re}[(u-iv)(c_j-c_i)]} du\, dv.$$

This set of equations is in R. E. Blahut, "Principles and Practice of Information Theory", Addison Wesley, 1991, Section 7.8, pp. 272-279.

Because the effective SNR metric calculated from the pilot tones depends only on the amplitude of the channel frequency response, and because the channel amplitude on the pilot tones is independent of timing error (re: equation (1) above), the effective SNR metric is also independent of timing error. However, in the presence of timing error, the noise variance may include inter-symbol interference and inter-tone interference and hence, the noise variance with timing error will be no smaller than the noise variance without timing error. It follows that the effective SNR metric computed with timing error will typically be slightly less than the effective SNR metric without timing error. Therefore, the effective SNR metric provides a conservative prediction of whether or not packets should be decodable.

Because the effective SNR, based on pilot tones, remains a good predictor of a supportable or achievable packet error rate (PER) even if there is timing error, the effective SNR can be used with the measured PER in an outer loop for timing acquisition/control as described below.

Timing Control Outer Loop Based on Effective SNR

Figure 5:
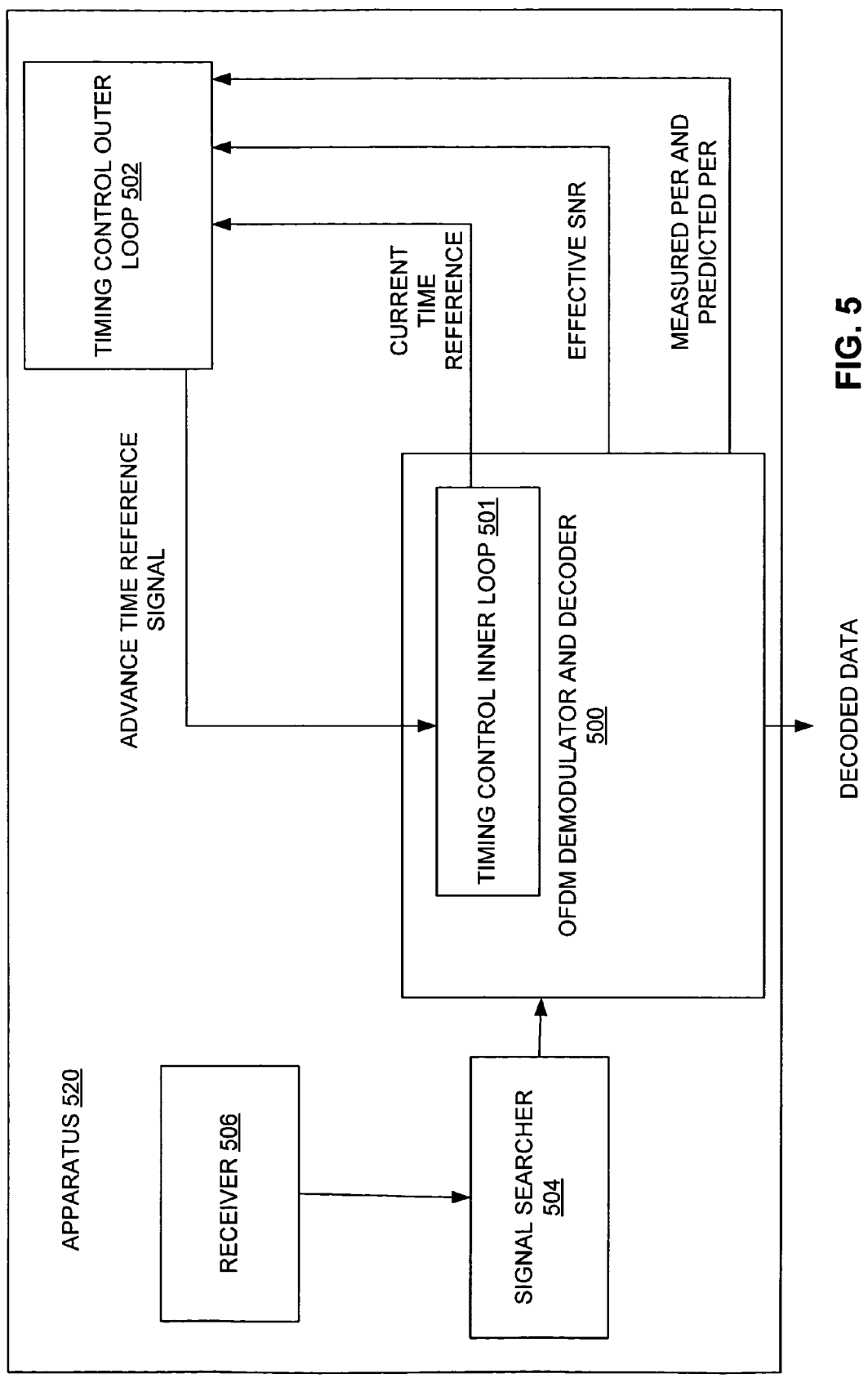
FIG. 5 illustrates a timing acquisition/control apparatus, which may be implemented in the system of FIG. 1.

FIG. 5 illustrates a timing acquisition/control apparatus 520, which may be implemented in a mobile station 104 or a base station 102 of FIG. 1. The apparatus 520 may be implemented in software, hardware or a combination of software and hardware. The apparatus 520 comprises a receiver 506, a signal searcher 504, an OFDM demodulator and decoder 500, and a timing control outer loop 502, which may also be called a timing control module. The OFDM demodulator and decoder 500 may be separate from or integrated with a CDM demodulator and decoder. The apparatus 520 may include other software and hardware components, such as a de-interleaver, channel estimators, etc. in addition to or instead of the components shown in FIG. 5.

Figure 6A:
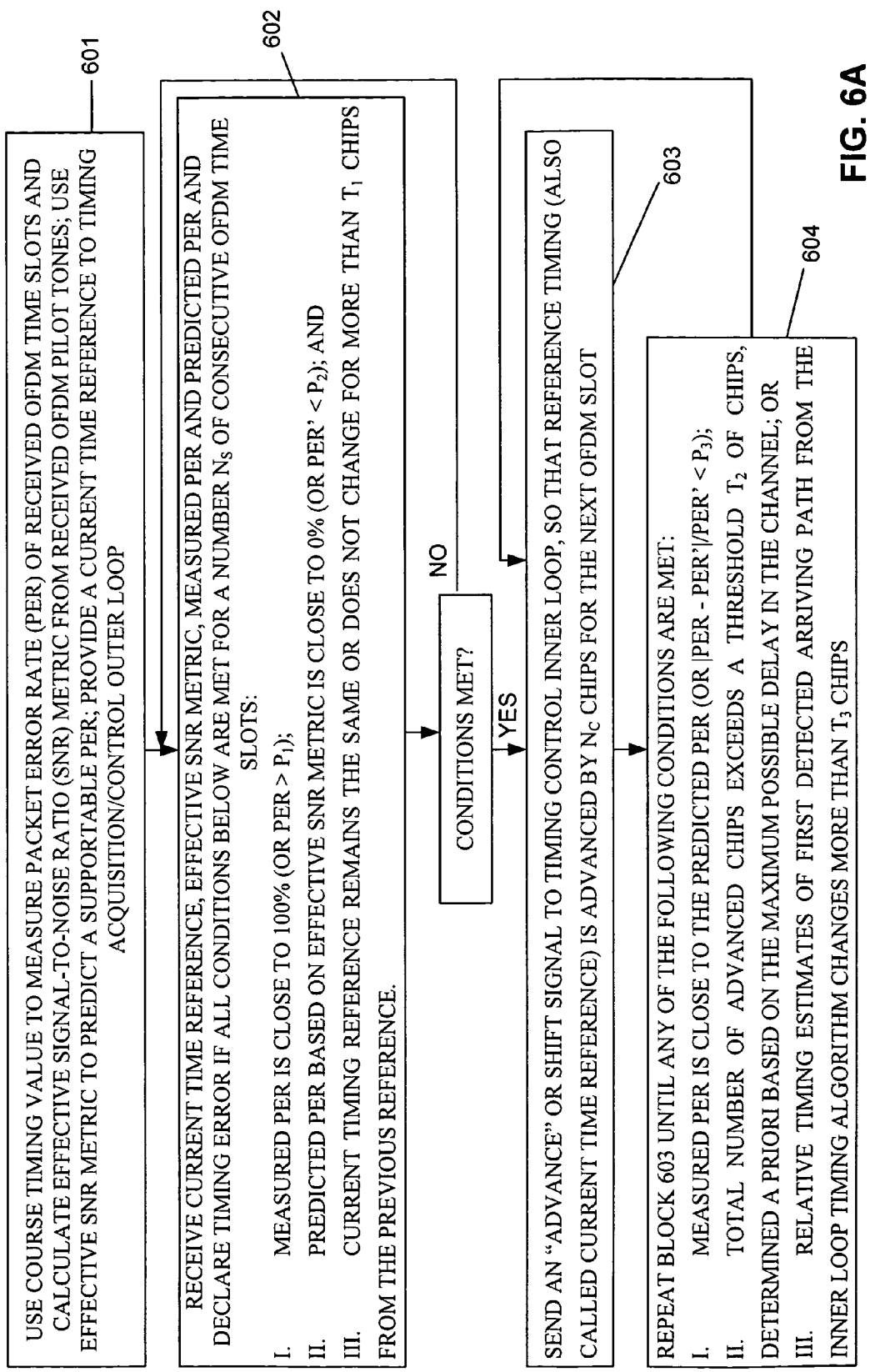
FIG. 6A illustrates a timing acquisition/control process, which may be performed by the apparatus of FIG. 5.
Figure 6B:
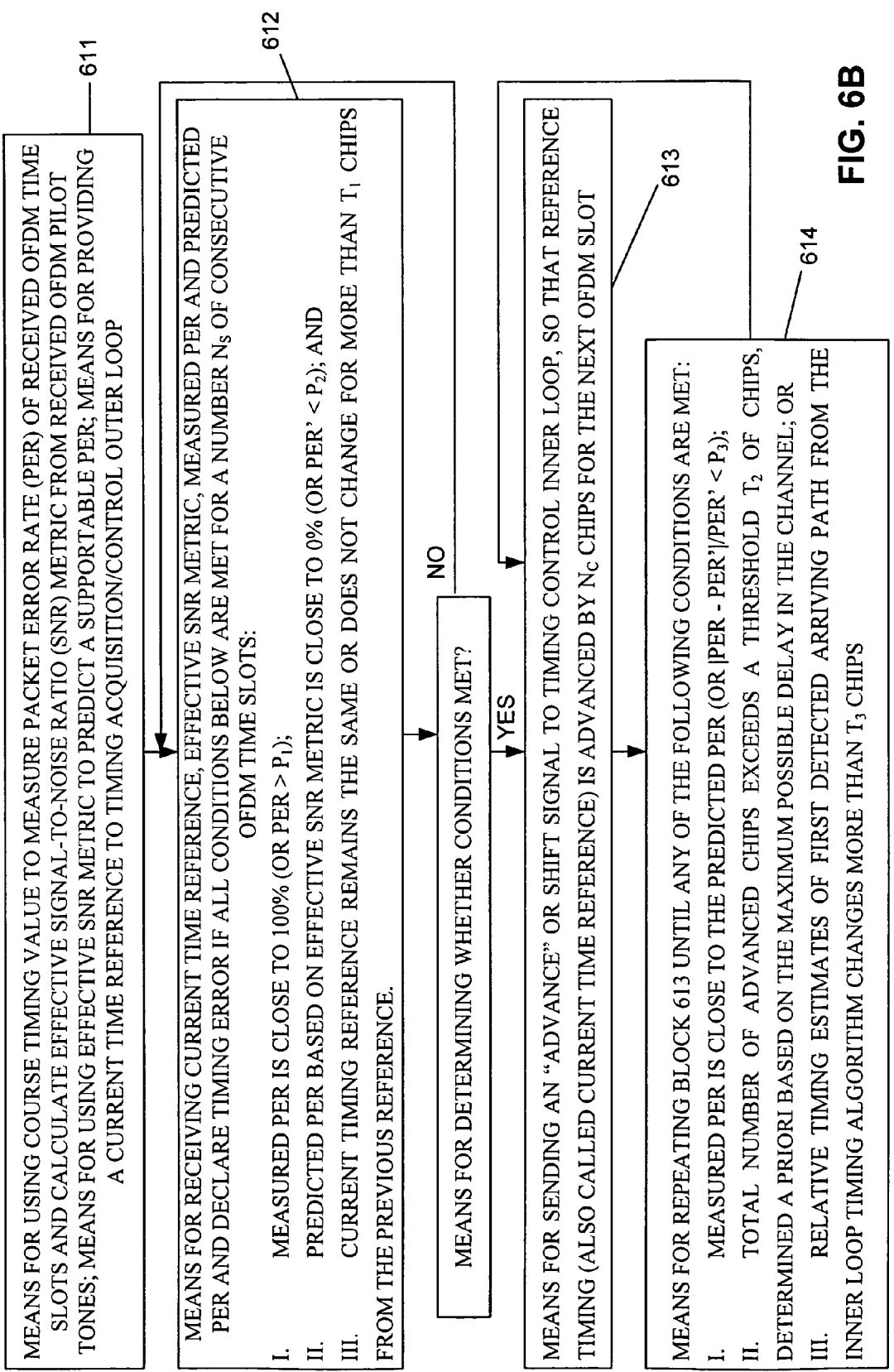
FIG. 6B illustrates an apparatus with means corresponding to the blocks in FIG. 6A.

FIG. 6A illustrates a timing acquisition/control process, which may be performed by the apparatus 520 of FIG. 5. FIG. 6B illustrates an apparatus with means 611-614 corresponding to the blocks 601-604 in FIG. 6A.

Figure 7:
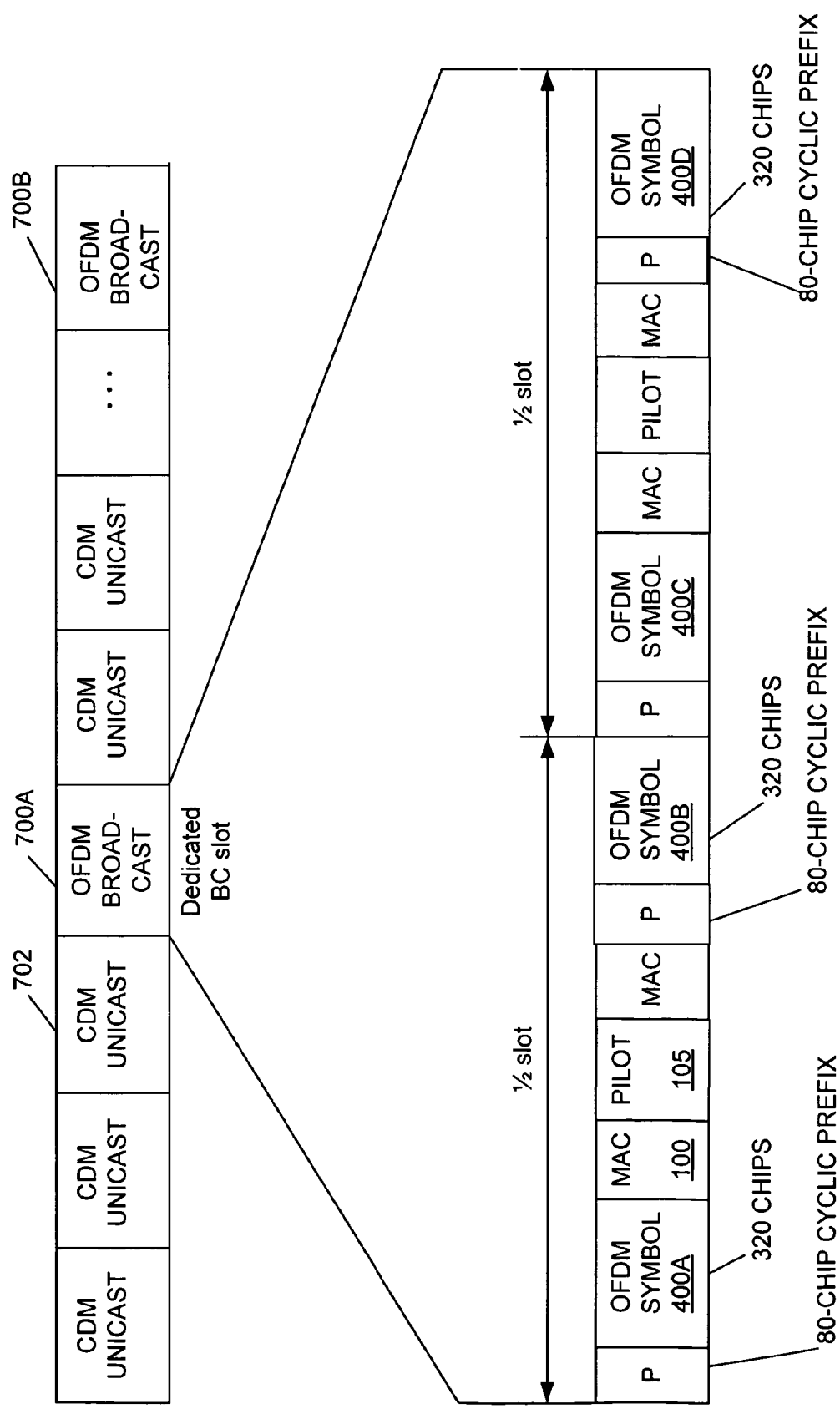
FIG. 7 illustrates a time division multiplexed pattern of code division multiplexed slots and OFDM slots.

FIG. 7 illustrates a time division multiplexed pattern of transmitted code division multiplexed slots 702 (e.g., unicast data) and OFDM slots 700 (e.g., broadcast data). FIG. 7 also shows an example of a specific OFDM slot structure.

The receiver 506 in FIG. 5 receives signals transmitted in CDM and OFDM time slots 702, 700A, 700B (FIG. 7), for example, from one or more base stations. The signal searcher 504, such as a CDMA signal searcher, determines a coarse timing value. The OFDM demodulator and decoder 500 demodulate and decode OFDM symbols 400, which include data tones and pilot tones, from the OFDM time slots 700A, 700B.

In block 601 in FIG. 6A, the OFDM demodulator and decoder 500 (FIG. 5) use the course timing value to measure a PER (measured PER) of received, decoded OFDM packets and to calculate an effective SNR metric from pilot tones of the OFDM symbols. A demodulator processes one or more OFDM symbols and provides this to the decoder, which then attempts to reproduce the packet that was input into the channel coding unit 302 in FIG. 3. The demodulator and decoder 500 (or alternatively, the outer loop 502) may use the effective SNR metric to predict a supportable PER (predicted PER'). For example, the effective SNR metric is compared to an SNR threshold depending on the data rate of the packet; if the effective SNR metric exceeds the threshold, the packet is predicted to be error free, otherwise the packet is predicted to be erroneous. The predicted PER may be a suitable time-averaging of these predictions. The demodulator and decoder 500 include a timing control inner loop 501, which provides a current time reference to the timing acquisition/control outer loop 502. The timing control inner loop 501 also refines the coarse timing value from the signal searcher 504, or updates the previous timing value by using the received OFDM symbols.

In block 602, the timing control outer loop 502 receives the current time reference, effective SNR metric, measured PER and predicted PER as inputs and declares a timing error if all three conditions below are met for a number $N_s$ of consecutive OFDM time slots 700. As shown in FIG. 7, "consecutive" OFDM time slots 700 may be separated in time by unicast CDM slots 702. $N_s$ may be equal to 64, 100, 256 or some other value.

The parameters (also called values, variables, thresholds, etc.) $N_S$, $N_C$, $P_1$, $P_2$, $P_3$, $T_1$, $T_2$, $T_3$ described herein may be selected, programmed and/or optimized according to various system parameters, such as the inner timing loop update rate, the accuracy of the pilot tone SNR measurements, and the network layout. These parameters may be set or determined by the device manufacturer or the wireless operator, etc., and default values can be programmed when the device is manufactured or during on-the-fly operation in the field.

i. measured PER is close to 100% (or PER>$P_1$, where $P_1$ may be 30%, for example);

ii. predicted PER based on effective SNR metric is close to 0% (or PER'<$P_2$, where $P_2$ may be 2%, for example); and iii. the current timing reference remains the same (or current timing reference does not change for more than $T_1$ chips from the previous reference, where $T_1$ may be equal to 10, for example).

If these three conditions have not been met, then the outer loop 502 may continue checking these three conditions.

Thus, if a number of consecutive OFDM slots do not decode correctly (i.e., high measured PER), then either (a) the channel is not "good" or (b) the current time reference is incorrect. If the channel is "good" (i.e., if the effective SNR metric is high and the predicted PER is low), then the time reference is probably incorrect and should be adjusted.

Figure 8:
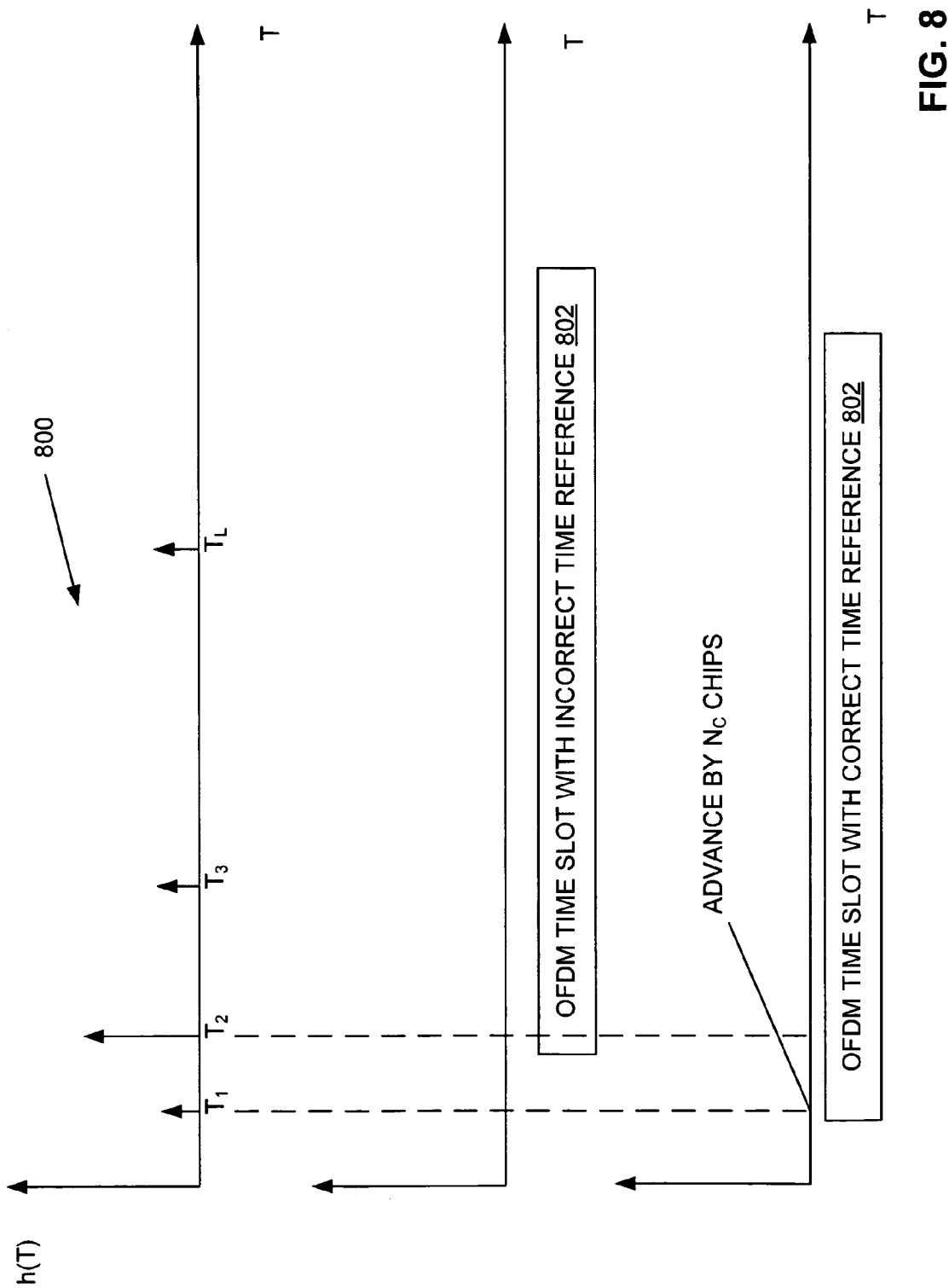
FIG. 8 illustrates examples of an actual channel response of transmitted OFDM signals, an OFDM slot with an incorrect time reference, and an OFDM slot with a correct time reference.

In block 603, if a timing error is declared, the outer loop 502 sends an "advance" or shift signal to the timing control inner loop 501, such that the reference timing (also called current time reference) is advanced by $N_C$ chips for the next OFDM slot, as shown in FIG. 8. $N_C$ may be equal to 5 to 8 chips, for example. After the timing error is declared, the timing estimate from the timing control inner loop 501 will not affect the reference timing. The last timing reference before the timing error is declared continues to be updated only by the timing control outer loop 502.

FIG. 8 illustrates examples of an actual channel response of transmitted OFDM signals 800, an OFDM slot with an incorrect time reference 802, and an OFDM slot with a correct time reference 804.

In block 604, the process may repeat block 603 until any of the following conditions are met:

i. the measured PER is close to the predicted PER' (or |PER−PER'|/PER'<$P_3$, where $P_3$ may be equal to 5.

ii. the total number of advanced chips exceeds a threshold $T_2$ of chips, determined a priori based on the maximum possible delay in the channel, where $T_2$ may be equal to 80, for example; or iii. the relative timing estimates of the detected first arriving path from the inner loop timing algorithm changes more than $T_3$ chips, where $T_3$ may be equal to 30, for example.

If the condition iii is satisfied, the timing reference for the next OFDM slots will be reset to the timing estimate from the timing control inner loop 501.

The description above provided an analysis of an estimated channel and the effective SNR of received OFDM symbols in the presence of timing errors. The analysis explains why effective SNR can serve as a diagnostic tool for determining whether there is a timing error when measured PER remains high but predicted PER based on the effective SNR metric remains low. The outer loop 502 may control timing based on the effective SNR metric.

Broadcast Content

Broadcast transmissions from multiple base stations 102 may be time-synchronous with each other, such that base stations 102 transmit the same broadcast content using the same waveform or modulation, e.g., same spreading code, at the same time. In this way, the multiple broadcast transmissions may be treated as multipath transmissions at the receiver. In other words, synchronous broadcast transmissions create artificial multipath, providing improved reception quality at the receiver with appropriate signal processing. An advantage of creating signals that behave as multipath is the ability of a receiver to maximize macro-diversity gain wherein a fading signal from one base station is offset by an identical, strongly received signal from another base station with differential propagation delay. Synchronous broadcast may provide a same spreading code for multiple transmitters.

Time-synchronism among the base stations may be beneficial when the synchronous broadcast transmission employs OFDM for a broadcast portion 700 of a transmission (FIG. 7). If the base station transmissions are not time-synchronous, differences in timing may effectively become multipath delays, which may increase the delay spread. Therefore, time-synchronous transmissions from multiple base stations 102 serve to align the OFDM transmissions and avoid introducing additional delay spread.

As shown in FIG. 7, base stations may broadcast data in interlaced broadcast time slots 700, which may be interlaced among time slots 702 used for user-specific (unicast) data transmissions. One embodiment uses an OFDM waveform for synchronous broadcast. Each broadcast slot may have three or four OFDM symbols, where one symbol may have more pilot tones than the other two OFDM symbols. Each mobile station may use the pilot tones of one or more OFDM symbols to estimate a channel response and derive a timing reference for demodulating the OFDM symbols.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A storage medium is coupled to the processor such that the processor may read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Headings are included herein for reference and to aid in locating certain sections. These headings are not intended to limit the scope of the concepts described therein under, and these concepts may have applicability in other sections throughout the entire specification.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

What is claimed is:

1. A method comprising:
   using a current time reference to decode a plurality of orthogonal frequency division multiplex (OFDM) symbols in a plurality of time slots;
   measuring a packet error rate of the decoded OFDM symbols;
   determining an effective signal-to-noise ratio (SNR) metric from pilot tones of the demodulated OFDM symbols;
   based on the determined effective SNR metric, predicting a supportable packet error rate;
   comparing the measured packet error rate and the predicted packet error rate; and
   based on said comparing, adjusting the current time reference before decoding a next OFDM time slot.

2. The method of claim 1, wherein comparing the measured packet error rate and the predicted packet error rate comprises:
   determining if the measured packet error rate is greater than a first threshold value; and
   determining if the predicted packet error rate is less than a second threshold value.

3. The method of claim 1, wherein based on said comparing, adjusting the current time reference comprises if the measured packet error rate is greater than the first threshold value, and the predicted packet error rate is less than the second threshold value, then adjusting the current time reference before decoding a next OFDM time slot.

4. The method of claim 1, wherein determining an effective signal-to-noise ratio (SNR) metric comprises using:

$$SNR = C^{-1}\left(\frac{1}{P}\sum_{k=1}^{P} C\left(\frac{|H_k|^2}{\sigma^2}\right)\right)$$

where $C(x)$ is a capacity of a Gaussian Channel with SNR x and input constrained to a selected type of modulation, where $\sigma^2$ denotes an estimated noise variance, where P is the number of pilot tones, and where $H_k$ represents an amplitude response of a channel.

5. The method of claim 4, further comprising using a lookup table to implement the function $C(x)$, and estimating the noise variance.

6. The method of claim 1, further comprising:
   determining whether the current time reference does not change for a number of consecutive OFDM time slots; and
   based on said determining, advancing the current time reference by a configured number of chips for the next OFDM time slot to be decoded.

7. The method of claim 1, further comprising:
   determining whether the current time reference does not change for a configured number of chips from a previous time reference; and
   based on said determining, advancing the current time reference by a configured number of chips for the next OFDM time slot to be decoded.

8. The method of claim 1, further comprising:
   wirelessly receiving multipath transmissions containing the OFDM symbols in the time slots; and
   searching the multipath transmissions to determine the current time reference.

9. The method of claim 1, wherein adjusting the current time reference comprises advancing the current time reference by a configured number of chips.

10. The method of claim 1, further comprising repeating said adjusting the current time reference until the measured packet error rate is close to the predicted packet error rate.

11. The method of claim 1, further comprising repeating said adjusting the current time reference until adjusting the current time reference exceeds a threshold number of chips determined a priori based on a maximum possible delay in a channel.

12. The method of claim 1, further comprising repeating said adjusting the current time reference until a relative timing of a first arriving path changes more than a threshold number of chips.

13. The method of claim 1, wherein the OFDM symbols comprise broadcast content intended for a plurality of mobile stations.

14. The method of claim 1, wherein the times slots containing OFDM symbols are time division multiplexed with time slots comprising user-specific data.

15. An apparatus configured to receive signals from a base station, the apparatus comprising:
means for using a current time reference to decode a plurality of orthogonal frequency division multiplex (OFDM) symbols in a plurality of time slots;
means for measuring a packet error rate of the decoded OFDM symbols;
means for determining an effective signal-to-noise ratio (SNR) metric from pilot tones of the decoded OFDM symbols;
based on the determined effective SNR metric, means for predicting a supportable packet error rate;
means for comparing the measured packet error rate and the predicted packet error rate; and
based on said means for comparing, means for adjusting the current time reference before decoding a next OFDM time slot.

16. The apparatus of claim 15, wherein the means for comparing comprises:
means for determining if the measured packet error rate is greater than a first threshold value;
means for determining if the predicted packet error rate is less than a second threshold value; and
if the measured packet error rate is greater than the first threshold value, and the predicted packet error rate is less than the second threshold value, means for adjusting the current time reference before decoding a next OFDM time slot.

17. An apparatus configured to receive orthogonal frequency division multiplex (OFDM) symbols from a base station, the apparatus comprising:
a timing control module configured to:
determine if a measured packet error rate of the received OFDM symbols is greater than a first threshold value;
determine if a predicted packet error rate is less than a second threshold value; and
if the measured packet error rate is greater than the first threshold value, and the predicted packet error rate is less than the second threshold value, then adjust a current time reference before decoding a next OFDM time slot.

18. The apparatus of claim 17, further comprising:
a receiver configured to wirelessly receive multipath transmissions containing OFDM symbols in a plurality of time slots; and
a searcher to search the multipath transmissions to determine the current time reference.

19. The apparatus of claim 18, wherein the times slots containing OFDM symbols are time division multiplexed with time slots comprising user-specific data.

20. The apparatus of claim 17, further comprising:
a decoder operable to:
use a current time reference to decode a plurality of OFDM symbols in a plurality of time slots;
measure a packet error rate of the decoded OFDM symbols;
determine an effective signal-to-noise ratio (SNR) metric from pilot tones of the decoded OFDM symbols; and
based on the determined effective SNR metric, predict a supportable packet error rate.

21. The apparatus of claim 17, wherein the timing control module is further configured to:
determine whether the current time reference does not change for a number of consecutive OFDM time slots; and
based on said determining, advance the current time reference by a configured number of chips for the next OFDM time slot to be decoded.

22. The apparatus of claim 17, wherein the timing control module is further configured to:
determine whether the current time reference does not change for a configured number of chips from a previous time reference; and
based on said determining, advance the current time reference by a configured number of chips for the next OFDM time slot to be decoded.

23. The apparatus of claim 17, wherein adjusting the current time reference comprises advancing the current time reference by a configured number of chips.

24. The apparatus of claim 17, wherein the timing control module is configured to repeat said adjusting the current time reference until the measured packet error rate is close to the predicted packet error rate.

25. The apparatus of claim 17, wherein the timing control module is configured to repeat said adjusting the current time reference until adjusting the current time reference exceeds a threshold number of chips determined a priori based on a maximum possible delay in a channel.

26. The apparatus of claim 17, wherein the timing control module is configured to repeat said adjusting the current time reference until a relative timing of a first arriving path changes more than a threshold number of chips.

27. The apparatus of claim 17, wherein the OFDM symbols comprise broadcast content intended for a plurality of mobile stations.

28. A computer program product, comprising:
a computer-readable medium comprising:
code for using a current time reference to decode a plurality of orthogonal frequency division multiplex (OFDM) symbols in a plurality of time slots;
code for measuring a packet error rate of the decoded OFDM symbols;
code for determining an effective signal-to-noise ratio (SNR) metric from pilot tones of the demodulated OFDM symbols;
code for, based on the determined effective SNR metric, predicting a supportable packet error rate;
code for comparing the measured packet error rate and the predicted packet error rate; and
code for, based on said comparing, adjusting the current time reference before decoding a next OFDM time slot.

29. The computer program product of claim 28, the computer-readable medium further comprising:
code for determining if the measured packet error rate is greater than a first threshold value; and
code for determining if the predicted packet error rate is less than a second threshold value.

30. The computer program product of claim 28, the computer-readable medium further comprising:
code for determining whether the current time reference does not change for a number of consecutive OFDM time slots; and code for, based on said determining, advancing the current time reference by a configured number of chips for the next OFDM time slot to be decoded.

31. The computer program product of claim 28, the computer-readable medium further comprising:
   code for determining whether the current time reference does not change for a configured number of chips from a previous time reference; and
   code for, based on said determining, advancing the current time reference by a configured number of chips for the next OFDM time slot to be decoded.

32. The computer program product of claim 28, the computer-readable medium further comprising:
   code for wirelessly receiving multipath transmissions containing the OFDM symbols in the time slots; and
   code for searching the multipath transmissions to determine the current time reference.

33. The computer program product of claim 28, the computer-readable medium further comprising code for repeating said adjusting the current time reference until the measured packet error rate is close to the predicted packet error rate.

34. The computer program product of claim 28, the computer-readable medium further comprising code for repeating said adjusting the current time reference until adjusting the current time reference exceeds a threshold number of chips determined a priori based on a maximum possible delay in a channel.

35. The computer program product of claim 28, the computer-readable medium further comprising code for repeating said adjusting the current time reference until a relative timing of a first arriving path changes more than a threshold number of chips.

* * * * *